Figure 1:
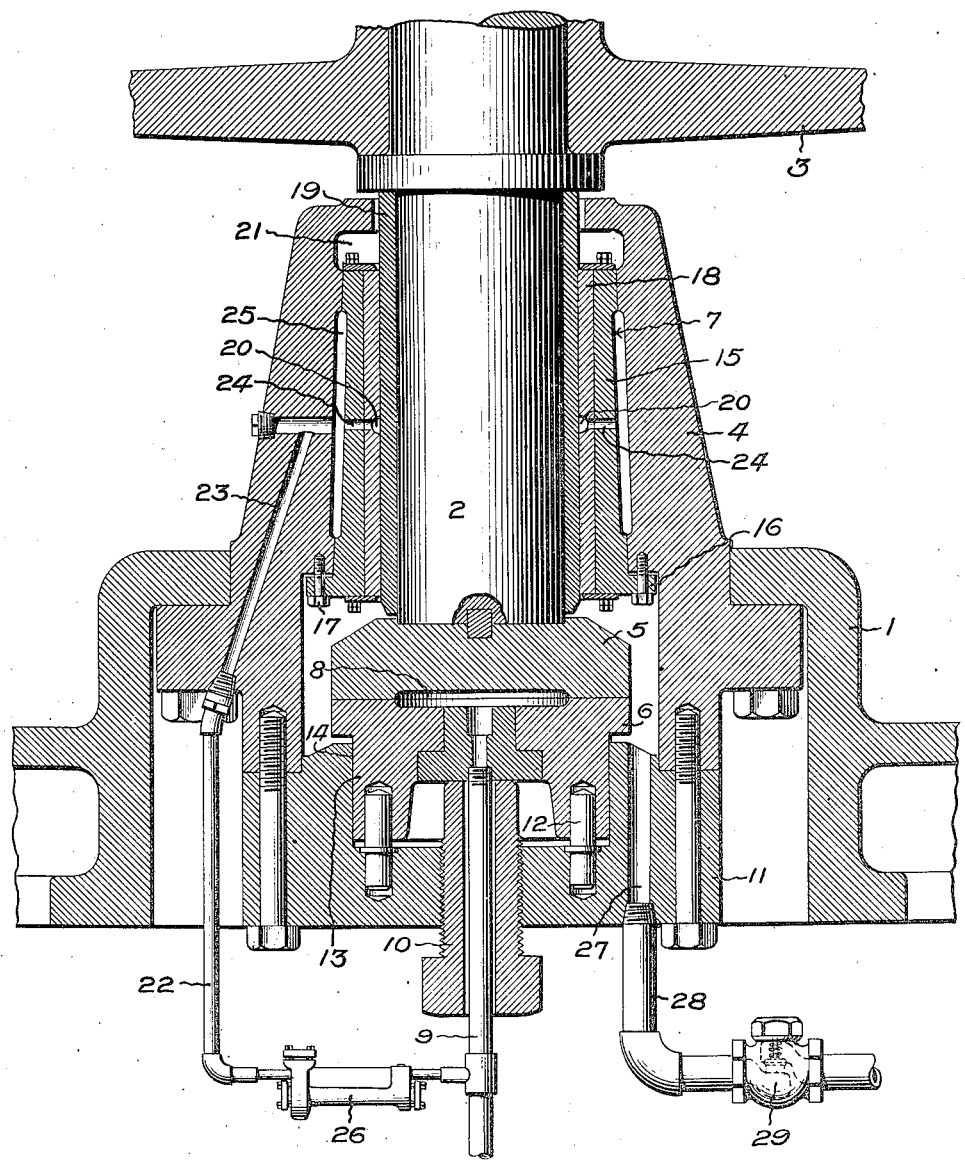

No. 846,796. PATENTED MAR. 12, 1907.
A. H. KRUESI.
LUBRICATING SYSTEM FOR TURBINE SHAFT BEARINGS.
APPLICATION FILED SEPT. 30, 1905.

3 SHEETS—SHEET 1.

Witnesses:
Marcus L. Byng.
Helen Alford

Inventor:
August H. Kruesi,
by Albert G. Davis
Att'y.

No. 846,796. PATENTED MAR. 12, 1907.
A. H. KRUESI.
LUBRICATING SYSTEM FOR TURBINE SHAFT BEARINGS.
APPLICATION FILED SEPT. 30, 1905.

3 SHEETS—SHEET 3.

Witnesses:
Marcus L. Byng.
Helen Orford

Inventor:
August H. Kruesi,
by Albt. H. D⸺
Att'y.

UNITED STATES PATENT OFFICE.

AUGUST H. KRUESI, OF SCHENECTADY, NEW YORK, ASSIGNOR TO GENERAL ELECTRIC COMPANY, A CORPORATION OF NEW YORK.

LUBRICATING SYSTEM FOR TURBINE-SHAFT BEARINGS.

No. 846,796. Specification of Letters Patent. Patented March 12, 1907.

Application filed September 30, 1905. Serial No. 280,784.

*To all whom it may concern:*

Be it known that I, AUGUST H. KRUESI, a citizen of the United States, residing at Schenectady, county of Schenectady, State of New York, have invented certain new and useful Improvements in Lubricating Systems for Turbine-Shaft Bearings, of which the following is a specification.

My invention relates to shaft-bearings, and relates more particularly to lubricating systems for combined step and guide bearings of the type used in connection with upright turbine-shafts; and it has for one of its objects to provide a lubricating system whereby a forced or positive flow of lubricating fluid can be maintained directly to each bearing either from a common source supplying them in parallel or from a separate source for each bearing, as desired. When the bearings are supplied from a single source, the maximum pressure of the supply is determined by the requirements of the step-bearing. This pressure must be sufficient to hydraulically support the shaft and its attached parts and is at times as high as one thousand pounds per square inch. This pressure is obviously much greater than that required for the guide-bearing. Therefore a resistance or pressure-reducing device is employed in circuit between the source of supply and the guide-bearing, so that the quantity supplied to the latter relative to the quantity supplied to the step-bearing will be properly proportioned.

It has been proposed hitherto to cause fluid exhausted from the step-bearing to pass through and lubricate the guide-bearing. In case of accidental failure of pressure in such an arrangement the bearing-blocks of the step-bearing come into contact, and more or less material is ground away. When pressure is restored, these particles mix with the exhaust and flow with it to the guide-bearing, lodging in the same and causing the bearing parts to be more or less seriously cut. By means of the present arrangement, however, this objection is overcome, as the exhaust from each bearing is immediately drained off after doing its appointed work.

The step and guide bearings are usually located in a casing by themselves, which is removably fitted into an opening in the bottom of the base of the turbine containing a vacuum-chamber. Arranged in this manner there is a tendency for air to leak through the bearing-casing, due to the effects of a vacuum in the condenser system. To prevent this and maintain the vacuum unimpaired, the supply of fluid to the guide-bearing besides lubricating the same has the additional function of serving as a packing between the shaft and the bearing, the pressure being of such a value and the direction of flow of the fluid through the bearing being such as to practically prevent leakage of air. In case the pressure on the step-bearing should fall while the shaft is rotating and a vacuum is maintained in the exhaust-base of the turbine a suction is produced through the bearing which tends to draw the fluid back from the drainage-conduit through the bearing-casing and the guide-bearing, carrying with it the gritty material and particles ground off of the bearing-blocks of the step-bearing, resulting in the particles cutting the guide-bearing surfaces. In order to overcome this, I employ a check-valve in the drainage-conduit, which closes against any suction produced by the vacuum in the exhaust-base, but permits the free discharge of the lubricant exhausted from the bearings.

For an understanding of the details of construction and the particular features of novelty reference is to be had to the following description and to the claims appended hereto.

Figure 2:
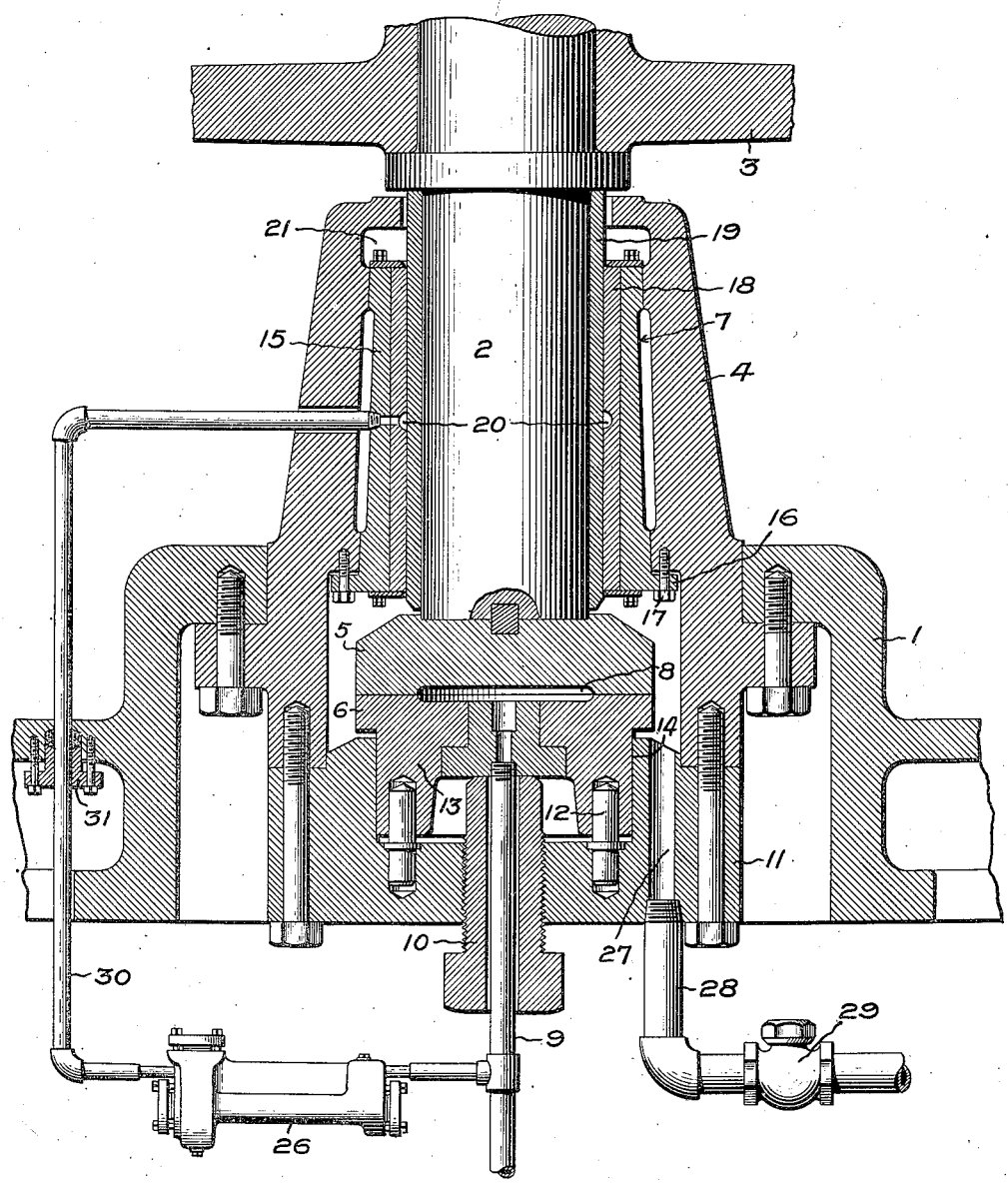
Figure 3:
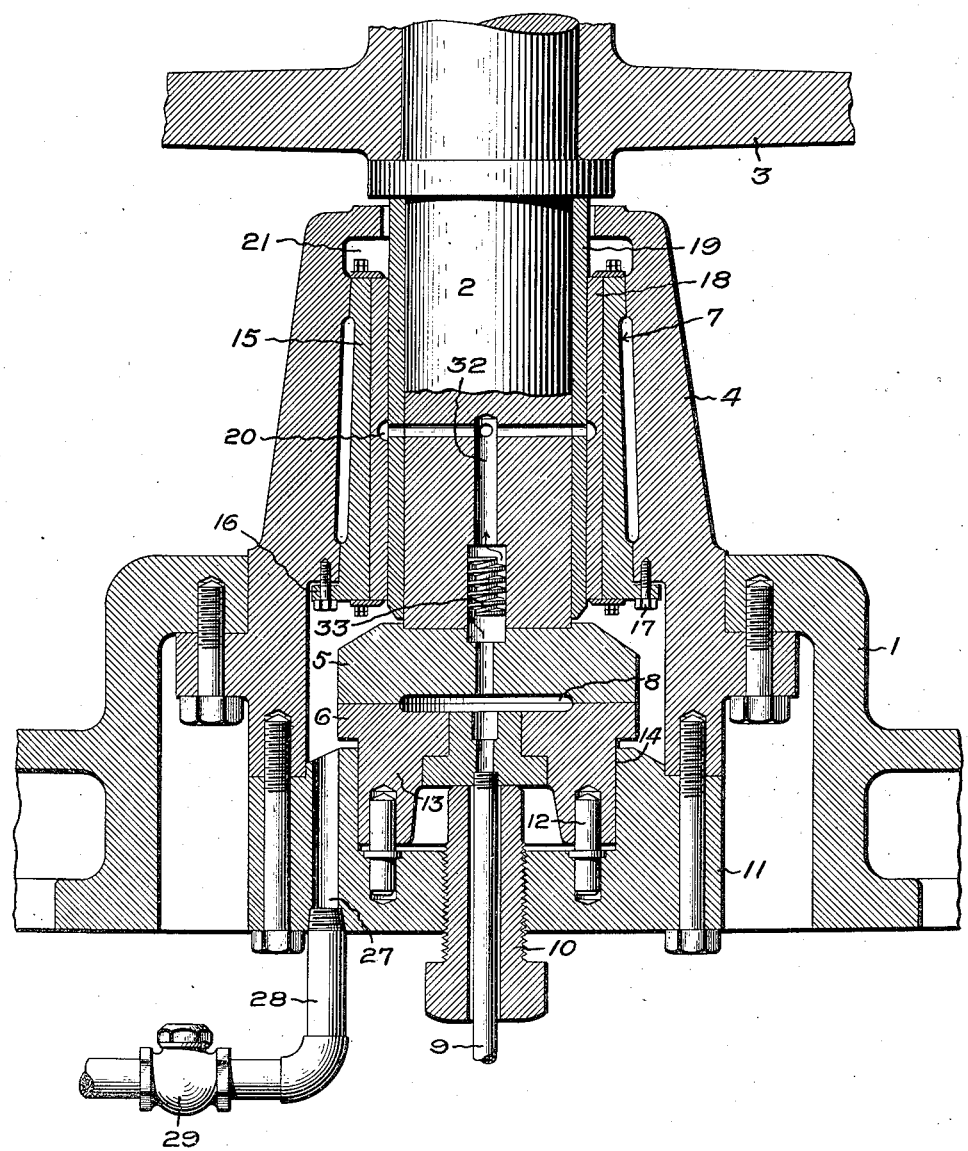

In the accompanying drawing, which illustrates certain embodiments of which the invention is capable, Figure 1 is a central vertical section of the bearing structure for a turbine-shaft, and Figs. 2 and 3 are similar views showing modifications.

Referring to the drawing, 1 represents a portion of the bottom of the chambered base of a turbine into which extends the vertical bucket-wheel-carrying shaft 2, a portion of one of the wheels being shown at 3. The turbine-base is chambered to receive the exhaust from the bucket-wheels, which is condensed therein by means of a condenser arranged therein or is discharged into a condenser separate therefrom. In the bottom of the turbine-base is a central opening in which is fitted the bearing-casing 4. The shaft 2 extends into the casing from the top and is supported upon bearing-blocks 5 and 6 in the lower end and is held against lateral displacement by the guide-bearing 7 in the upper end of the casing. The adjacent surfaces of the two-step bearing-blocks are chambered out to form a pressure-chamber 8, to which fluid is supplied from a suitable source by the conduit 9, that communicates with the chamber 8 through the central bore in the lower bearing-block 6. The pressure of the fluid supplied to the chamber 8 is such as to hydraulically support the weight of the shaft and its attached parts and maintain a film between the bearing-blocks. The fluid forming said film passes continuously from the chamber 8 to the space surrounding the blocks which constitute a drainage-chamber. In order to adjust the clearances between the moving buckets and the adjacent part, the shaft is adapted to be vertically adjusted by means of a screw 10, which screws into a threaded opening extending centrally through the head or bottom-plate 11 of the casing. The upper bearing-block is keyed to the shaft 2 to rotate therewith, while the lower block is prevented from turning by means of studs 12, secured in the head 11. In order to guide the movement of the lower block during the vertical adjustment of the shaft, it is provided with a piston-like extension 13, that moves in a cylindrical depression 14 in the head 11.

The interior surface of the upper part of the bearing-casing is finished by a tapering cut to receive the shell 15 of the guide-bearing, which has an outside taper to correspond with that of the casing. The lower end of the shell is provided with a circumferential flange 16, by means of which the screw-bolts 17 secure the shell in the casing. Carefully fitted in the shell and secured thereto is a removable wearing-sleeve 18. In order to prevent wear on the shaft proper, a sleeve 19 is secured thereto, the outer surface of which engages the inner surface of the sleeve or lining of the bearing. This sleeve is also removable. A slight clearance is provided between the lining and the sleeve in which a body of lubricating fluid is adapted to flow. This fluid is supplied to the clearance from an annular groove 20, located centrally between the ends of the lining or sleeve 18, the fluid flowing by reason of its pressure to the opposite ends of the bearing. The exhaust fluid from the lower end of the guide-bearing discharges into the chamber surrounding the step-bearing, while that from the upper end discharges into a chamber 21, thence passing into the turbine-base through the clearance around the shaft. In the present system of lubrication the fluid employed is water, as it can discharge into the turbine-base without materially affecting the condenser system or preventing the condensed water being returned to the boiler, as would be the case if other fluids, such as oil, were used.

In the present illustrations the lubricating-fluid for the guide-bearing is derived from the source that supplies the step-bearing. For this purpose a branch supply-conduit 22 is provided that extends from the main conduit 9 to the passage 23 in the bearing-casing, the said passage communicating with the passages 24 in the shell and sleeve 18. Between adjacent surfaces of the casing and shell is formed a chamber 25, to which fluid flows from the passage 23 before entering the passage 24. By means of this chamber a body of fluid is maintained around the shaft, which tends to cool the guide-bearing. In the branch conduit 22 a baffling or pressure-reducing device 26 is arranged, its object being to reduce the pressure of the fluid from that suitable for the step-bearing to that suitable for the guide-bearing. The pressure of the lubricant for the guide-bearing should be sufficient to maintain a positive flow between the bearing-surfaces thereof and the shaft and also to prevent leakage of air into the turbine-base. The fluid exhausting from the two bearings discharges through a conduit comprising a passage 27 in the head 11 and a conduit 28 leading back to the source of supply. In order to prevent a reverse flow of fluid through the drainage-conduit under the suction produced by the vacuum in the turbine-base when the pressure of the lubricating system fails, a check-valve 29 is arranged therein. By preventing the return of fluid to the bearing the particles of metal ground out from the bearing-blocks are prevented from being carried up into the guide-bearing, where injury to the bearing-surfaces would result.

In Figs 2 and 3 the structural features of the bearings are the same as those shown in Fig. 1, and similar parts are designated by similar reference characters.

Referring to Fig. 2, the supply of fluid to the guide-bearing is conveyed through a conduit 30, which extends through the bottom of the turbine-base and connects at its discharge end with the annular groove 20 of the bearing-lining. Where the conduit extends through the base, a packing 31 is arranged to prevent leakage. A baffler or pressure-reducing device 26 is also employed in the supply-conduit.

As to the construction shown in Fig. 3, the branch supply-conduit is dispensed with and a simple bore 32 is provided in the turbine-shaft and upper bearing-block, which at its upper end branches radially and connects with the annular groove 20 in the bearing-lining. In the bore 32 a baffling device 33 is arranged, its function being similar to the baffling device of Figs. 1 and 2. This baffling device comprises a plug having a spiral groove, the circumference of the plug fitting the bore, which latter is slightly enlarged to receive the plug. The spiral forms a long restricted passage of high resistance through which the fluid must flow, the cross-section of the passage and its length determining the final pressure of the fluid that passes to the guide-bearing. The baffling device in Figs. 1 and 2 may be, and preferably is, a member similar to the plug 33, but inclosed in a suitable casing provided therefor.

In accordance with the provisions of the patent statutes I have described the principle of the operation of my invention, together with the apparatus which I now consider to represent the best embodiment thereof; but I desire to have it understood that the apparatus shown is only illustrative and that the invention can be carried out by other means.

What I claim as new, and desire to secure by Letters Patent of the United States, is—

1. The combination of a shaft, a step-bearing, a guide-bearing, a casing inclosing the bearings, and a source of lubricant under pressure which is common to and supplies both bearings in parallel.

2. The combination of a shaft, a step-bearing therefor, a guide-bearing, a casing inclosing both of the bearings, and a lubricating system which supplies lubricant in parallel to the bearings at different pressures.

3. The combination of a shaft, relatively rotatable bearing-blocks therefor, a source of fluid under a pressure sufficient to maintain a lubricating-film between the blocks, a guide-bearing, a casing containing both bearings, and a pressure-reducing means which receives fluid from said source and supplies it to the guide-bearing.

4. The combination of a shaft, a step-bearing therefor comprising relatively rotatable blocks, a guide-bearing for the shaft, a casing in which both bearings are located, a conduit for supplying fluid under pressure to the step-bearing to maintain a lubricating-film between the blocks, a second conduit leading from the first to the guide-bearing, and a means in the second conduit for reducing the pressure of the fluid supplied to the guide-bearing.

5. The combination of a chambered base, a shaft extending into said base, two relatively rotatable bearing-blocks forming a step-bearing for the shaft and having a chamber between them, a guide-bearing for the shaft, a conduit for supplying fluid under pressure to said chamber to maintain a supporting-film between the blocks, a second conduit leading from the first at a point without the base to a point within the base to supply fluid to the guide-bearing, and a means in the second conduit for reducing the pressure of the fluid before it is delivered to the guide-bearing.

6. The combination of a chambered base, a shaft extending into the base, a step and guide bearing for the shaft, a casing for the bearings containing a chamber which receives all of the exhaust-lubricant from the step-bearing and a part of the exhaust from the guide-bearing, a second chamber that receives the remainder of the exhaust from the guide-bearing, conduits that supply lubricant to the step and guide bearings, and a conduit that discharges the lubricant from the first-mentioned chamber.

7. The combination of a chambered base, a shaft extending into the base, a guide-bearing for the shaft, a casing for the guide-bearing having a drainage-chamber, means for supplying fluid under pressure to the guide-bearing at a point intermediate its ends whereby the fluid flows between the shaft and bearing and exhausts from the ends of the latter respectively into said chamber and chambered base, and means for conveying away fluid from said drainage-chamber.

8. The combination of a chamber which is adapted to contain vapor under a pressure different from that of the atmosphere, a shaft extending into the chamber, a guide-bearing therefor between which and the shaft fluid under pressure tends to pass, means for maintaining a flow of fluid between the shaft and bearing for lubricating the same and also preventing the passage of fluid under pressure between the atmosphere and the chamber.

9. The combination of a chamber which is adapted to contain vapor under a pressure different from that of the atmosphere, a shaft extending into the chamber, a step-bearing for the shaft, a guide-bearing for the shaft between which and the shaft fluid under pressure tends to pass, means for maintaining a flow of fluid through the step-bearing and between the shaft and the guide-bearing for lubricating the same, and also preventing the passage of fluid due to the difference in pressure between the atmosphere and the chamber.

10. The combination of a shaft, a step-bearing, a guide-bearing, means for supplying a lubricant to the step-bearing at a pressure sufficient to support the shaft, a means for supplying lubricant to the guide-bearing, a casing for both bearings containing a chamber which is located between the bearings and receives the drainage from both, and a drainage-conduit leading from the chamber.

11. The combination of an exhaust-chamber adapted to contain vapor at a pressure below atmosphere, a shaft extending into the said chamber, a step and guide bearing for the shaft, means for supplying lubricant to the bearings, a drainage-conduit for conveying away the lubricant-exhaust from the bearings, and a check-valve in said conduit for preventing the return of exhaust to the bearings under the influence of the low pressure in the chamber.

12. The combination of an exhaust-chamber adapted to contain vapor at a pressure below atmosphere, a shaft extending into the chamber, step and guide bearings for the shaft which are arranged in the chamber, means for supplying lubricant independently to the bearings, a casing for the bearings containing a chamber into which lubricant exhausts, a drainage-conduit connected with the chamber, and a check-valve in said conduit.

In witness whereof I have hereunto set my hand this 25th day of September, 1905.

AUGUST H. KRUESI.

Witnesses:
W. L. BLENKISON,
S. M. BARBOR.